United States Patent [19]

Amadon et al.

[11] Patent Number: 4,578,919
[45] Date of Patent: Apr. 1, 1986

[54] SELF-STOWING ARRANGEMENT FOR STRUCTURAL TENSION MEMBERS WITH TAPER LATCH HINGE COUPLING JOINTS

[75] Inventors: John F. Amadon, Melbourne; Warren H. Miller, Jr., Palm Bay, both of Fla.

[73] Assignee: Harris Corporation, Melbourne, Fla.

[21] Appl. No.: 398,191

[22] Filed: Jul. 14, 1982

[51] Int. Cl.$^4$ ............................................. E04H 12/18
[52] U.S. Cl. ....................................... 52/645; 52/108; 52/632
[58] Field of Search .................. 52/108, 111, 117, 121, 52/632, 645, 646; 16/239, 319, 347, 231, 387; 285/283; 182/152; 244/158 R, 159

[56] References Cited

U.S. PATENT DOCUMENTS

| | | | |
|---|---|---|---|
| 2,549,194 | 4/1951 | Hale | 16/347 |
| 2,982,379 | 5/1961 | Fisher | 52/111 |
| 3,295,699 | 1/1967 | Bauernschub, Jr. | 52/108 X |
| 3,486,279 | 12/1969 | Webb | 52/646 X |
| 3,564,789 | 2/1971 | Vyvyan et al. | 52/646 |
| 3,650,333 | 3/1972 | Fueslein | 16/347 |
| 3,739,538 | 6/1973 | Rubin | 52/108 |
| 3,751,863 | 8/1973 | Lyons | 52/111 |
| 4,027,440 | 6/1977 | Hamblin | 52/108 |

FOREIGN PATENT DOCUMENTS

| | | | |
|---|---|---|---|
| 2487133 | 1/1982 | France | 244/159 |
| 682623 | 8/1979 | U.S.S.R. | 52/108 |

OTHER PUBLICATIONS

NASA, *Useful New Technology*, 1971, p. 5.

Primary Examiner—John E. Murtagh
Assistant Examiner—Andrew Joseph Rudy
Attorney, Agent, or Firm—Antonelli, Terry & Wands

[57] ABSTRACT

A compact, deployable support structure arrangement includes a collapsible truss structure having tension cable members formed of specifically configured tension tapes. These tension tapes diagonally cross one another as they extend between respective pairs of longeron support truss members. The tension tapes are preformed to have two straight sections joined together by a plurality of loops. Because of the nature of the topological surface defined by such shapes, the tapes, when relaxed, will automatically refold into a stable, non-tangled condition. The hinge joints that pivotally interconnect successive longeron subsections employ a novel, effectively zero-backlash, taper latch hinge mechanism. As the portions of the hinge are rotated about a pivot axis, a locking pin is caused to contact an outer cam surface of a hinge contact plate face so as to be driven against the bias action of a spring, and to travel along the outer cam surface. Eventually, the longeron subsections rotate to a point where the longerons are in substantially end-to-end abutment causing the locking pin to be captured by the inner surface of a hook plate so that the locking pin thereby creates a wedge effect that locks the now abutting longerons subsections together.

24 Claims, 18 Drawing Figures

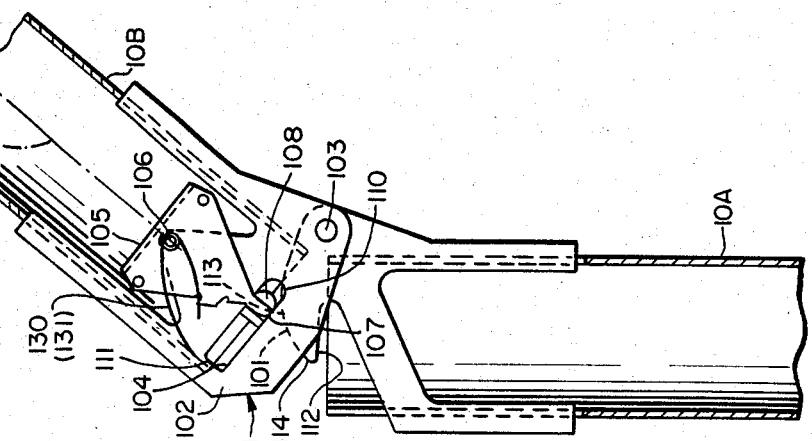
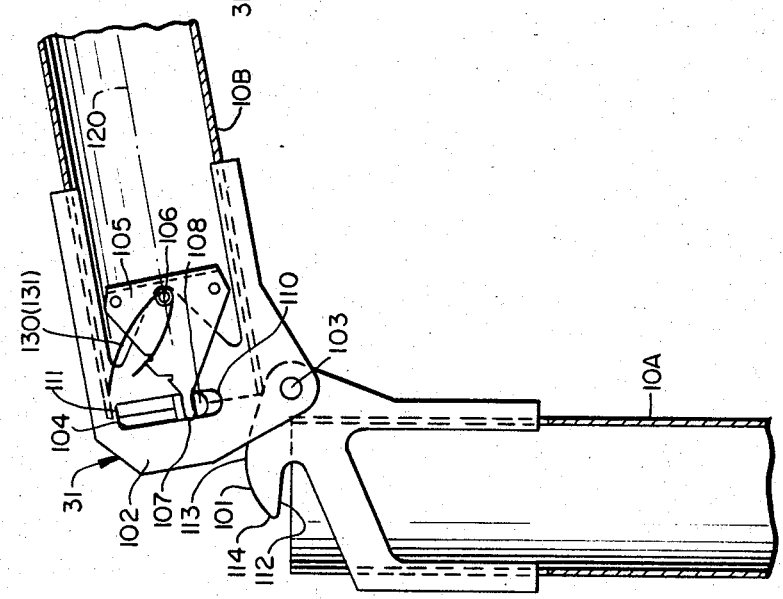
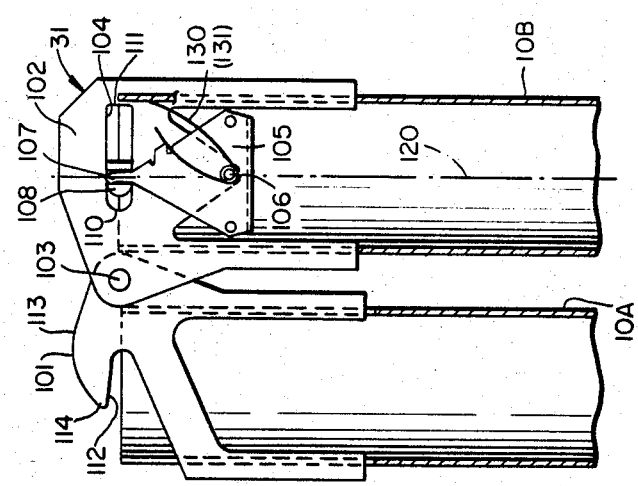

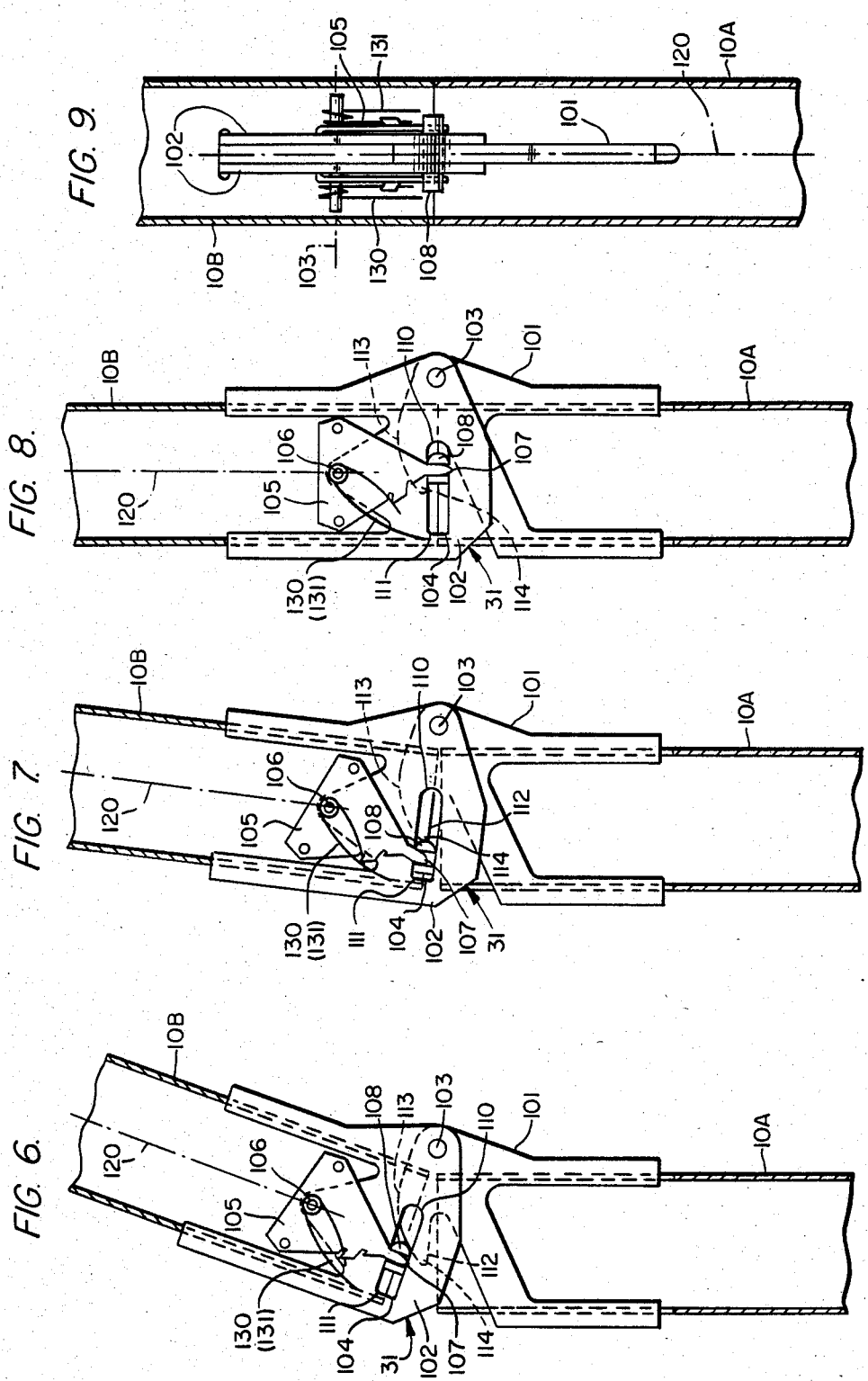

SELF-STOWING ARRANGEMENT FOR STRUCTURAL TENSION MEMBERS WITH TAPER LATCH HINGE COUPLING JOINTS

FIELD OF THE INVENTION

The present invention relates to deployable structures, such as support structure arrangements for space applications, and is particularly directed to a support structure that is capable of being deployed from and restored into a compact package.

BACKGROUND OF THE INVENTION

Large-sized structural support arrangements which can be stowed and transported as a compact package and rapidly deployed to full size are required in a variety of applications, such as ground installations erected by workmen in the field or space assemblies deployed by remotely controlled manipulators. Frequently such structures, especially those to be deployed in an extraterrestrial environment, are composed of tubular compression members and cable type tension members. Unfortunately, attempts to restow and redeploy these conventional tube-cable structures have usually resulted in tangled cables, thereby making them unsuitable for space deployment. As a result prior practical space-deployable structures have avoided the use of flexible tension members. For exemplary illustrations of conventional support arrangements of the type described above, attention may be directed to the U.S. Pat. Nos. to Rubin 3,739,538, Vyvyan et al 3,564,789, Webb 3,486,279 and Fisher 2,982,379.

SUMMARY OF THE INVENTION

In accordance with the present invention the cable entanglement problems of conventional expandable/-collapsible structures are overcome by a compact, deployable support structure arrangement in which the tension cable members are specifically configured tension tapes. These tension tapes diagonally cross one another as they extend between respective pairs of longeron support truss members. Each longeron truss member is comprised of two tubular-shaped longeron subsections pivotally hinged to one another and to respective sets of triangularly-connected cross member subsections. Like the longerons the cross members are tubular-shaped, while the diagonal tension tapes are substantially flat shaped and are under pretension.

Preferably, the tension tapes are preformed to have two straight sections joined together by a plurality of loops, with the straight sections of the tapes being cross-curved to retain their shape. Because of the nature of the topological surface defined by such shapes, the tapes, when relaxed, will automatically refold into a stable, predetermined condition. This condition is such that the tapes do not become tangled; instead the loop portions thereof occupy non-interfacing sections of storage space among the folded longerons and cross members, while the straight sections align themselves in parallel with the stacked longerons and cross members.

As an additional feature of the structure of the present invention, each of the hinge joints that pivotably interconnects successive longeron subsections employs a novel, effectively zero-backlash, taper latch hinge mechanism. This mechanism is a single axis hinge, one portion of which is attached to the end of one longeron subsection and another portion of which is attached to the end of an adjacent longeron subsection. One of the hinge portions has a contact hook plate face that is pivotally joined to another slotted plate unit in which a locking pin rides. As the two hinge portions are rotated about the pivot axis the locking pin, which is spring-biased toward one end of the slot, is caused to contact the outer cam surface of the contact plate face so as to be driven against the bias action of the spring, and to travel along the outer cam surface. Eventually, the longeron subsections rotate to a point where the locking pin is maximally displaced by the outer cam surface of the hook plate. Further rotation of the longerons into substantially end-to-end abutment causes the locking pin to be captured by the inner surface of the hook plate, as it is moved into a double shear position between the outer slotted plate unit and the inner hook plate. The locking pin thereby engages the taper face of the hook and the flat faces of the slots of the outer slotted plate unit, to create a wedge effect that locks the now abutting longerons subsections together.

The resulting coupling between the longeron subsections removes mechanical play that would otherwise be present because of hinge pin clearances, as it is automatically self adjusting to compensate for wear or distortion of the interface surfaces. Moreover, the number of moving parts is effectively minimized, as contrasted with complex conventional zero backlash mechanisms, which use multiple linkages or elastic deformation of materials to create mechanisms for performing the same task.

BRIEF DESCRIPTION OF THE DRAWINGS

FIGS. 3-8 illustrate respective side views for successive rotational positions of the taper hinge joint between a pair of longeron subsections of the truss structure shown in FIGS. 1 and 2;

FIG. 9 is a front view of the pair of longeron subsections and locked hinge joint condition shown in FIG. 8;

DETAILED DESCRIPTION

Figure 1:
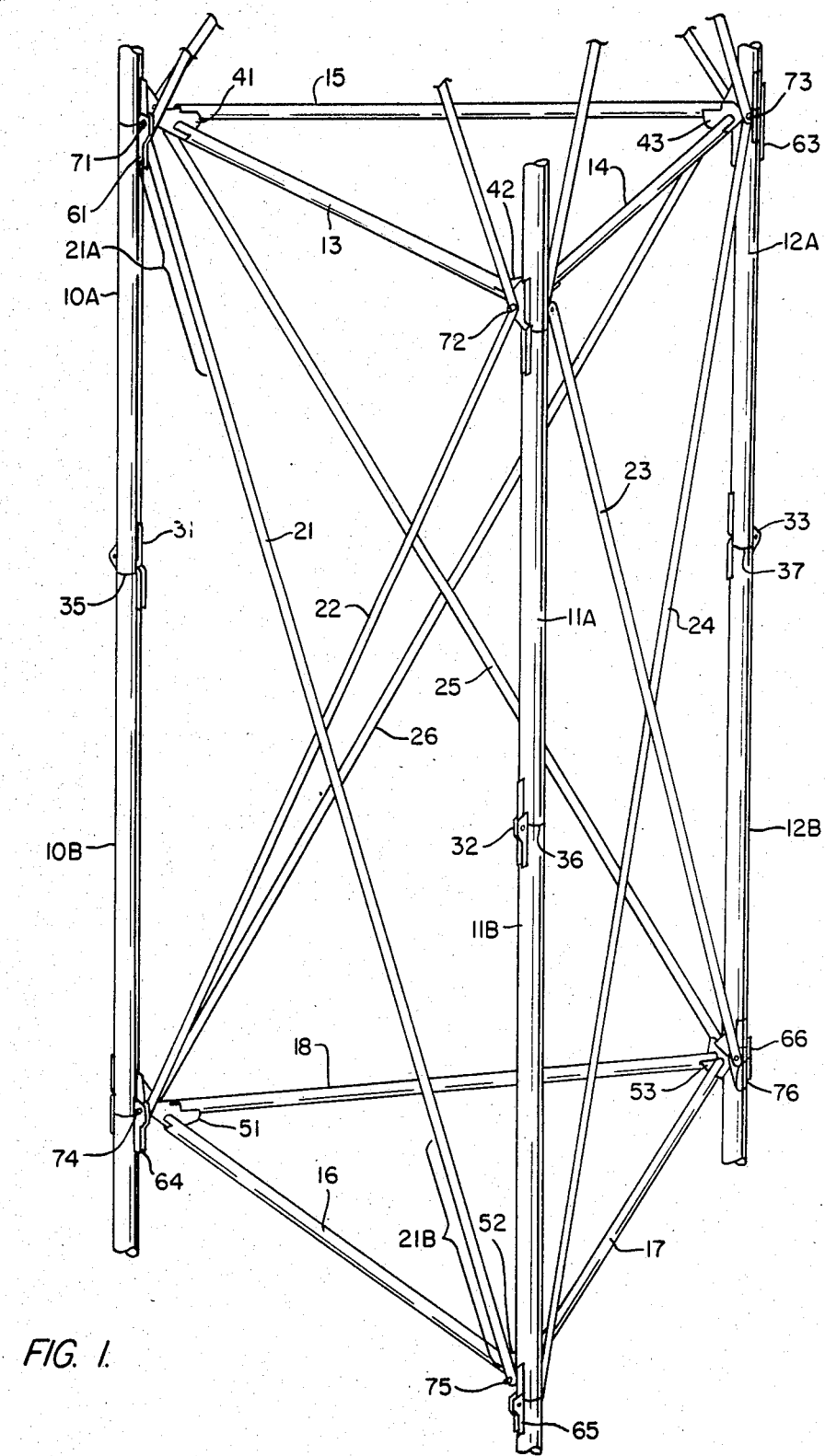
FIG. 1 illustrates a portion of a three-sided support truss structure employing diagonal tension bands and taper hinge joints in accordance with the present invention.

Referring now to the drawings, FIG. 1 illustrates a portion of a three-sided support truss structure employing diagonal tension bands and taper hinge joints according to the present invention. The portion of the three-sided support truss structure shown in FIG. 1 is one section of a multi-sectioned support structure, such as may be employed for providing a rigid connection between an antenna and a spacecraft. Each section of the three-sided support truss structure is comprised of a pair of triangular-shaped cross member braces which are joined at opposite ends of a triad of longerons. The longerons are capable of folding into a compact stowed position in such a manner that they are parallel to and immediately adjacent to the arms of the triangles.

More particularly, in the portion of the structure shown in FIG. 1, an individual section is comprised of an upper triangular-shaped cross member brace arrangement formed of tubular cross members 13, 14 and 15, the ends of which are ridgedly affixed (e.g. welded) to respective vertex joint pieces 41, 42 and 43. Similarly, at the other end of the section of interest, a triangular-shaped cross member arrangement is comprised of tubular cross members 16, 17 and 18, joined together by vertex connection pieces 51, 52 and 53. The vertex connection pieces of the respective triangular-shaped cross member brace arrangements have attached mounting pins for affixing the vertex connection pieces to the taper latch hinges that are provided at opposite ends of the longerons.

In FIG. 1, connections between the triangular-shaped cross member brace arrangements are provided by sets of longerons 10A–10B, 11A–11B and 12A–12B. These longerons are tubular shaped, namely, they have a circular cross section and the ends of the longerons are slotted to receive the leg portions of respective taper latch hinges. Considering upper longeron subsection 10A, for example, the upper end of longeron subsection 10A as shown in FIG. 1 is provided with slots for receiving the legs of a taper latch hinge 61 while the lower portion of the upper longeron subsection 10A is provided with slots for receiving the legs of taper latch hinge 31. Taper latch hinge 61 is also coupled to the lower longeron subsection of the next upper truss section (only partially shown in the upper portion of FIG. 1). The manner in which the taper latch hinges are joined with the longerons and cooperate with one another to provide the support and pivotal stowing capability of the present invention will be explained in detail below in conjunction with detailed description of the individual components of the taper latch hinges.

In a manner similar to upper longeron subsection 10A, lower longeron subsection 10B has its upper portion coupled to the legs of taper latch hinge 31 and its lower portion coupled to legs of a portion of the taper latch hinge 64. Taper latch hinge 64 is also coupled to the upper longeron subsection of the next lower truss section (only partially shown in the lower portion of FIG. 1). Longeron subsections 11A and 11B are coupled to one another and to the triangular-shaped cross member arrangements by way of taper latch hinges 62, 32 and 65, as shown, while upper and lower longeron subsections 12A and 12B are coupled together and to the triangular-shaped cross member arrangements via taper latch hinges 63, 33 and 66. Like taper latch hinges 61 and 64, respective hinges 62/65 and 63/66 are also coupled to longeron subsections of the adjacent upper and lower truss sections (only partially shown in FIG. 1).

For completing an individual section of the three-sided support truss structure, tension members which diagonally cross one another are provided. Between longeron sections 10A–10B and 11A–11B and the upper and lower triangular-shaped cross member arrangements, there are provided diagonally crossing tension bands 21 and 22. As pointed out previously and as shown in detail in FIGS. 2A, 2B and 2C, each tension band is formed effectively as a flat band preformed into a shape having two straight sections 21A, 21B and a pair of helical loops 21C, 21D therebetween. In its extended form shown in FIG. 1, tension band 21, like the other tension bands, is straight and flat under stress. In its relaxed state, however, it takes on a shape as shown in FIG. 2A. The preformed straight sections of this tension band are shown at portions 21A and 21B as having creases 21E and 21F (as shown in cross-section in FIG. 2B) to form cross-curve sections to provide rigidity to sections 21A and 21B. Between straight sections 21A and 21B are helical tension band sections 21C and 21D (having a flat cross-section as shown in FIG. 2C) which, when relaxed, will form multiple helical loops as shown in FIG. 2A, for achieving a non-tangled and rapidly stowed configuration.

In a similar fashion, diagonal crossing tension bands 23 and 24 are disposed between longeron subsections 11A–11B and 12A–12B and upper and lower triangular shaped cross member braces attached thereto at taper hinges 62–66, 63–65, while tension bands 25 and 26 are coupled between longeron subsections 12A, 12B and 10A, 10B and upper and lower triangular shaped cross member braces attached thereto at taper hinges 63–64, 61–66. The ends of the tension bands are affixed to the taper latch hinges, preferably by way of the pins about which the latch hinge components rotate during folding of the truss structure. Thus, for example, opposite ends of tension band 21 extend between a pin 71 at taper latch hinge 61 and a pin 75 at taper latch hinge 65. The other tension bands extend between respective pins of diagonally opposite taper latch hinges as shown in the Figure. Preferably, all of the structural members are formed of a graphite-epoxy composite to provide a lightweight and extremely strong support structure, thereby making the strutural members especially suitable for rigid spacecraft applications.

Figure 2:
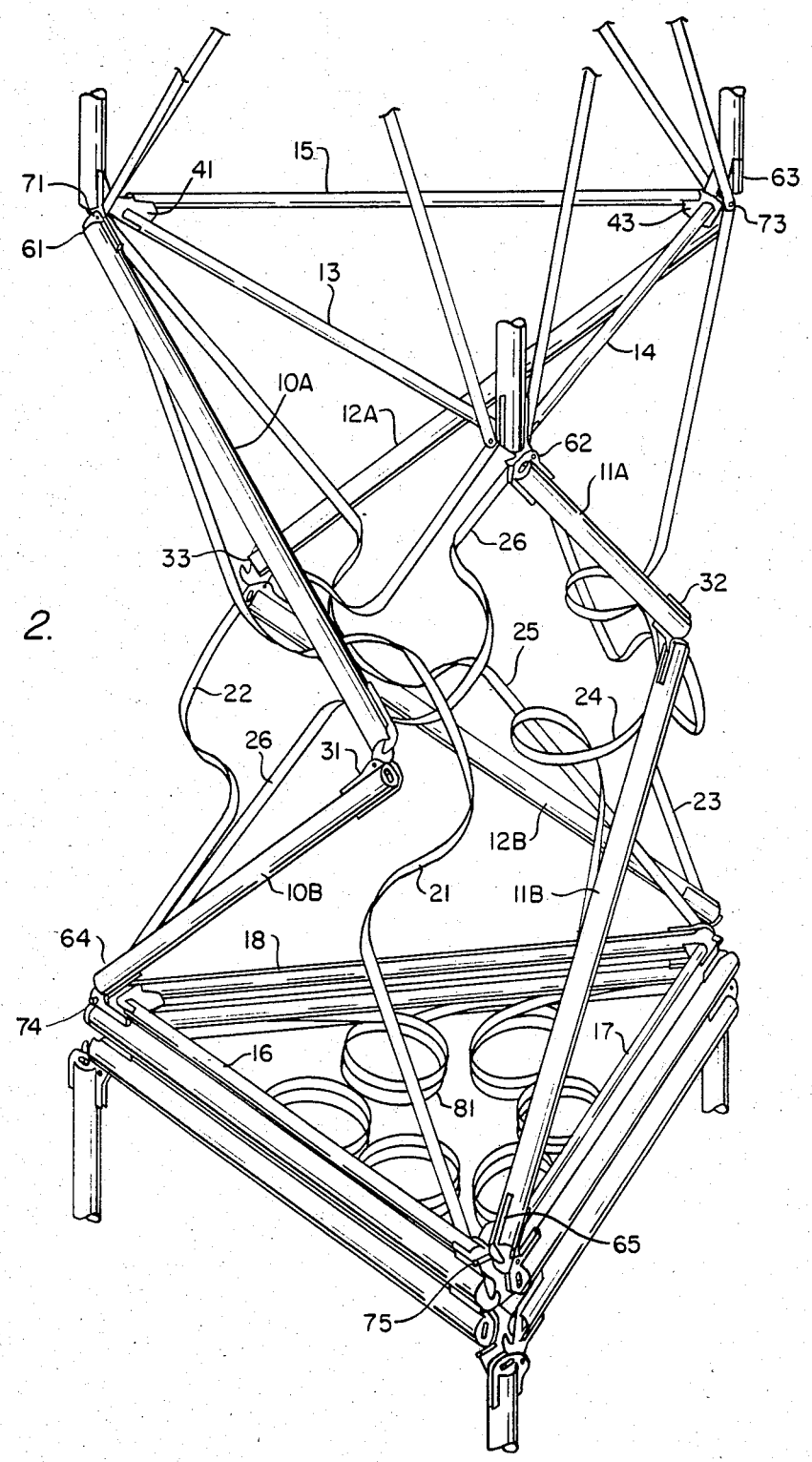
FIG. 2 shows the truss structure of FIG. 1 in a partially folded and stowed condition.
Figures 2A, 2B, 2C:
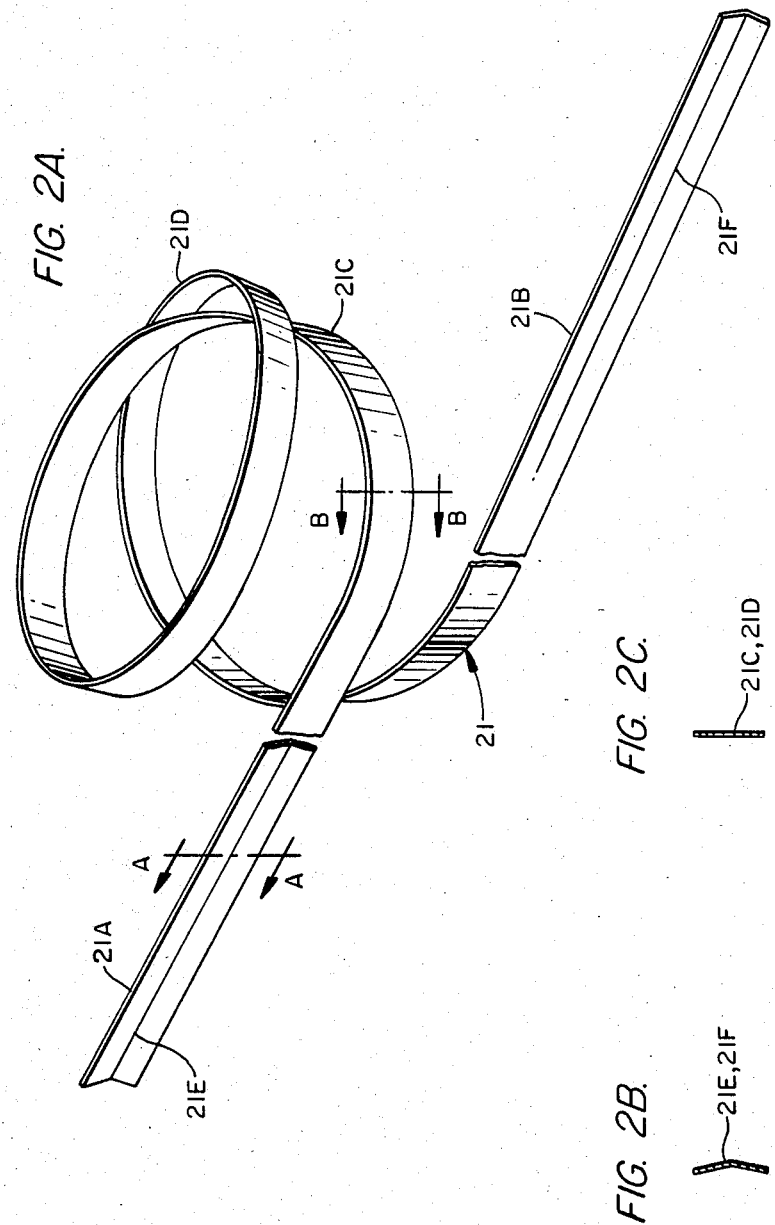
FIG. 2A shows a helical-shaped tension tape employed in the truss structure depicted in FIGS. 1 and 2.
FIGS. 2B and 2C are cross-sectional views of the helical-shaped tension tape shown in FIG. 2A, taken along lines A—A and B—B, respectively.

FIG. 2 shows the truss structure of FIG. 1 in partial folded and stowed position. In FIG. 2, the section of the truss described in detail above with reference to FIG. 1 is illustrated as being partially folded with the respective portions of the taper latch hinges 31, 32 and 33 being rotated so that the upper and lower longeron subsections are no longer straight, but rather are folded with respect to one another, as shown. Similarly, the opposite ends of the longerons which are connected to the triangle-shaped cross member arrangements are rotated about the respective pin axes at the joints therebetween.

The lower portion of FIG. 2 shows the manner in which a previously completed folded subsection is stacked in its stowed condition, the respective longeron subsections folding in parallel with one another and in line with the respective cross members of the triangle-shaped cross member arrangements. In the partially folded configuration shown in FIG. 2, lower longeron subsection 10B is being folded towards cross member 16 which is parallel and stacked with a pair of longeron subsections of a previously folded section. Similarly, longeron subsection 11B is being folded by way of taper hinge 65 to be stacked on top of and in parallel with member 17. Finally, lower longeron subsection 12B is being folded by the action of taper hinge 66 towards cross member 18.

The band-shaped tension members 21–26 are shown with the tension removed as the structure is folded, and with the central portions of the tension members beginning to take on a curved or loop configuration while the preformed extremities thereof remain straight. For a previously stowed section illustrated in the lower portion of FIG. 2, a respective one of the tapes 81 thereof is shown in its fully relaxed state with the two straight end portions and loops therebetween being neatly nested among the remaining five tapes of the tension bands for the stowed section of the support truss structure. As each respective section of the support truss structure is collapsed or folded for storage, the respective longeron subsections fold in parallel with one another and in parallel with respective cross members of the triangle-shaped cross member arrangements so that there is eventually formed a triangular-shaped compact structure within the open space of which the tension bands are neatly arranged. This non-tangled compact arrangement makes the truss structure immediately ready for redeployment.

Referring now to FIGS. 3-8, the configuration of an individual taper latch hinge and its operation during folding of the longeron subsections to which it is attached is illustrated.

FIG. 3 shows a pair of longeron subsections, here longeron subsections 10A and 10B, joined together by taper latch hinge 31. Longeron subsection 10A may be considered a hook plate tube, since the end thereof is slotted to receive hook plate 101 of taper latch hinge 31, whereas longeron subsection 10B may be considered a slot plate tube, since the end thereof is slotted to receive a pair of slot plates 102. The slots provided in the tubular-shaped longerons receive a pair of legs of the hook plate or slot plates, as shown. The plates, i.e. hook plate 101 and the pair of slot plates 102, are joined together by way of a pin passing through apertures in each plate along axis 103, which is normal to the plane of the drawing as shown in FIG. 1. This pair of slot plates and the single hook plate act together to create a double shear condition on the pin.

In order to facilitate an understanding of the structure and operation of the taper hinge joint shown in its fully opened position in FIG. 3 and various degrees of closure towards locking engagement shown in FIGS. 4-9, a detailed description of the individual parts of a taper latch hinge will be now described with reference to FIGS. 10-15.

Figure 10:
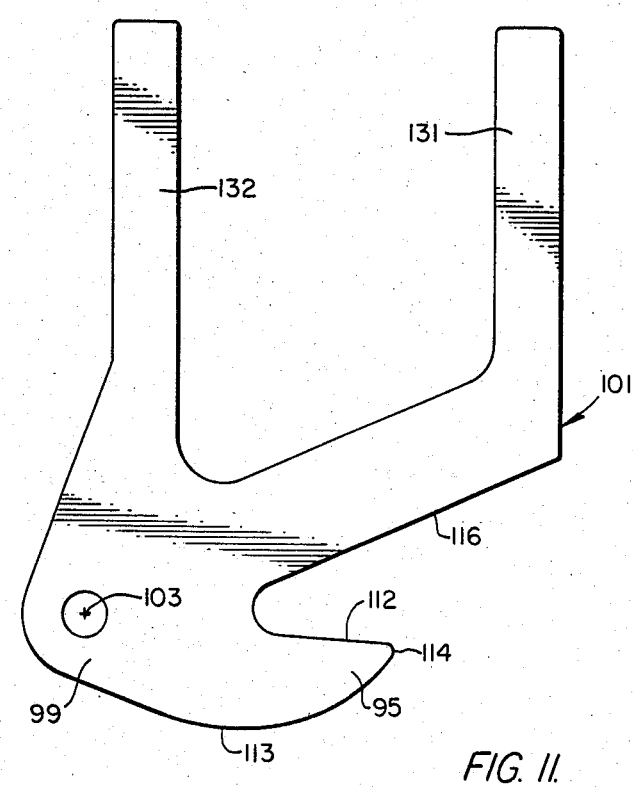
FIG. 10 shows, in detail, the configuration of the hook plate portion of the taper hinge joint.

As shown in FIG. 10, the hook plate 101 contains a pair of legs 131 and 132 which fit within slots provided in tubular longeron subsection 10A. The hook portion of hook plate 101 is formed of a cam surface 113 which extends from a land area 99 of plate 101 adjacent to aperture 103 towards a tip 114. Cam surface 113 and an upper hook face 112 form a beak 95 above a lower hook face 116. The resulting hook surface is intended to receive a locking taper pin 108 (shown in detail in FIG. 12), which slides within the slots in a pair of slot plates, an individual one of which is shown in FIG. 11.

Figure 11:
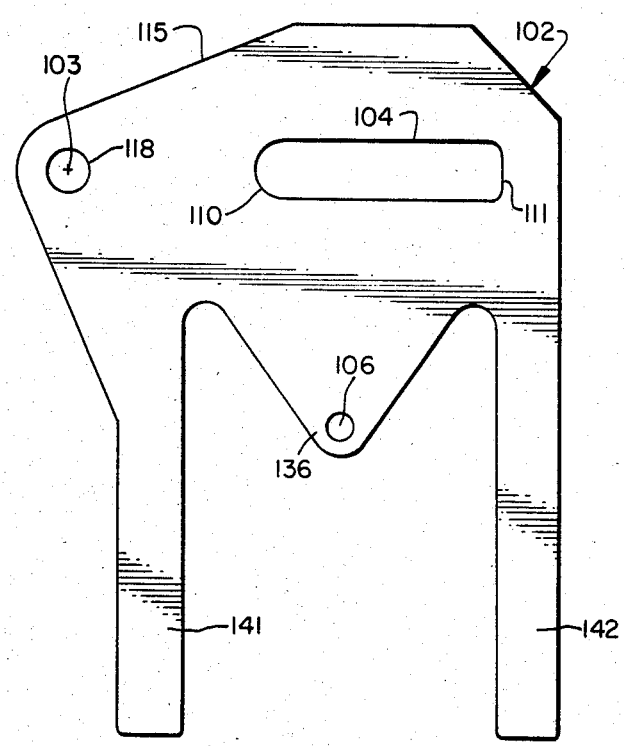
FIG. 11 shows the details of a slot plate portion of a taper hinge joint.

More specifically, referring to FIG. 11 an individual slot plate 102 has a pair of legs 141 and 142 which fit into slots parallel with one another in the longeron subsection 10B, as shown in the side view of FIG. 3. Extending from these legs is a triangular land portion 136 provided at its vertex portion with an aperture through which a pin passes along a pin axis 106. Also provided in slot plate 102 is a slot 104 which extends in parallel with and is disposed so as to be axially aligned with the surface of the flat end of the longeron subsection 10B to which slot plate 102 is attached. The pin axis 103 of aperture 118 formed in slot plate 102 is colinear with the axis of slot 104, so that it will be intersected by the plane of the flat end faces of each longeron subsection upon which the respective portions of the taper hinge are mounted, as will be described below. The upper surface 115 of slot plate 102 extends beyond the flat end face of the tubular longeron subsection upon which the slot plate is mounted. However, the opposing longeron subsection is keyed or slotted to receive the extending surface portion 115 of the slot plate 102 as the longeron subsections are rotated into abutment with one another, as will be explained below.

As pointed out above and as shown in FIG. 9, a pair of slot plates 102 are provided as part of the taper hinge 31, the slot plates being disposed in parallel but spaced apart from one another at one end of the longeron subsection upon which they are mounted. The slot plates 102 are spaced apart to provide an area through which the hook plate 101 passes during operation of the joint. The triangular, biasing guide 105 partially surrounds the slot plates 102 and pivots about pin axis 106.

Figure 12:
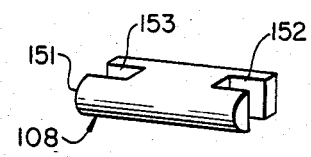
FIG. 12 is a pictorial illustration of the locking taper pin of the taper hinge plate.

FIG. 12 shows a pictorial view of an individual taper locking pin 108. The locking pin has a pair of slots or cut outs 153 and 152 and has a curved front surface 151. Each of slots 152 and 153 is provided to receive a respective toe of a triangular biasing guide 105, shown in detail in FIGS. 13-15 to be described below. As the triangular biasing guide 105 is rotated about pin axis 106, the locking taper pin 108 is caused to slide in the slots 104 of the respective slot plates 102.

Figure 13:
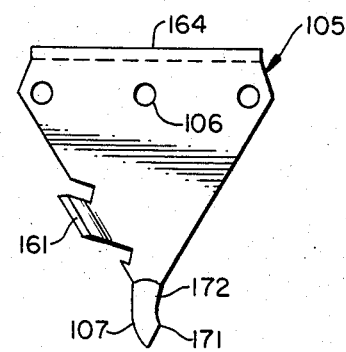
FIGS. 13-15 are respective side, top and front views of the triangular biasing guide portion of a taper hinge.
Figure 14:
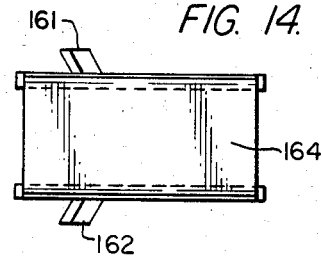
Figure 15:
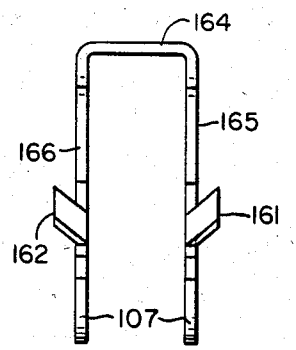

Referring now to FIGS. 13-15, where the respective side, top and front views of the configuration of an individual triangular biasing guide 105 are shown, extending from an upper plate portion 164 are a pair of side plate portions 165 and 166, each of which is substantially triangular-shaped and has a toe portion 107 at the lower vertex thereof. The toe portion contains cam surfaces 171 and 172 that fit into the slot 152 or 153 of an individual locking taper pin 108. Tabs 161 and 162 provide anchors for springs 130 and 131. Also provided are springs 130 and 131 which pass over the pin along pin axis 106 for engaging the interior cylindrical walls of the longeron subsection thereby maintaining the triangular biasing guide with a predetermined rotational bias about pin axis 106, so as to urge the locking taper pin 108 towards the circular end 110 of the slot 104 within a respective guide plate 102. The purpose and results of this urging action will be readily understood from the illustrations of successive positions of the longerons shown in FIGS. 3-8.

As mentioned above, FIG. 3 shows a pair of longeron subsections 10A and 10B in parallel with one another with the taper latch hinge in its fully opened position. In this condition, the triangular biasing guide 105 is biased by way of springs 130 and 131 to urge the taper locking pin 108 against face 110.

As longeron subsection 10B is rotated about pin axis 103 relative to longeron subsection 10A, as shown in FIG. 4, the triangular biasing guide 105 continues to hold the pin 108 against the circular face 110 of the slot 104 with in the slot plates 102. Eventually, as the longeron subsections are rotated further relative to one another, slot 104 begins to cross the plane of the cam surface 113 of hook plate 101, as shown in FIG. 5. Further rotation causes the curved front surface 151 of the taper pin 108 to contact the cam surface 113 of the hook plate 101, and the taper pin 108 begins to ride on the cam surface 115, causing the triangular biasing guide to be rotated against the bias of the spring about pin axis 106, as shown in FIG. 6.

Further rotation of the respective longeron subsections causes movement of the taper locking pin 108 away from the circular end face 110 of slot 104 within each of the slot plates 102, until the taper locking pin reaches the tip 114 of the cam surface 113 of the hook plate 101, as shown in FIG. 7. At this position, the longeron subsections are almost in parallel and their end faces nearly abut one another. Further movement of the longeron subsections permits the taper locking pin to pass beyond the tip 114 of the cam surface 113 of the hook plate 101, whereby the spring action of triangular biasing guide which is urging the locking pin 108 against the cam surface 113 of hook plate 101 causes the taper locking pin 108 to pass into the hook slot bounded by upper hook face 112 and lower hook face 116, as shown in detail in FIG. 10, referenced-above. The locking taper pin 108 moves within slot 104 and is wedged against the upper hook face 112 of hook plate 101, as shown in FIG. 8. At this point the locking taper pin 108 is essentially colinear with the axis 120 of the longeron, forming a load path with minimal eccentricity.

FIG. 9 illustrates a front view of a taper hinge configuration in the locked position shown in FIG. 8, with slotted plates 102 being parallel with one another and disposed on opposite sides of the central axis 120 of the tubular longerons. Hook plate 101 is essentially located in parallel with a plane passing between plates 101 and 102 and coplanar with the central axis 120 of the respective longeron subsections 10A and 10B. The axis of slot 104 along which locking taper pin 108 is urged, as well as the pin axis 103 about which hook plate 101 and slot plates 102 rotate, lies in the plane of the joint 35 of the abutting end faces of the longeron subsections 10A and 10B, as pointed out previously. This insures that the resulting hinge joint is rigid and stable. The wedge action of the hook plate 101 and the cooperating taper pin 108 riding in slot 104 of slot plates 102 automatically accounts for wear on the frictional surfaces of the components and prevents play between separate portions of the hinge and the longeron subsections joined thereby.

As pointed above in conjunction with the description of the FIGS. 1 and 2, apertures are provided in flanges of the cross member vertex joints through which the taper hinge rotational pins pass along axis 103. Similarly, it is at pin axis 103 that reinforced ends of the diagonal tension bands are preferably coupled in the manner shown in FIG. 1. Using this common pin axis for a connection of the separate parts of the taper latch hinge, the vertex joints of the triangle-shaped cross member arrangements, and the diagonal tension members provides for an extremely compact arrangement and facilitates ease of storage and redeployment. Between successive longerons where cross members and tension bands are not provided, such as at joints 35, 36 and 37, shown in FIG. 1, the same type of taper latch hinges are provided except that there is no connection of other members at the pin axis 103.

Since the same type of latch hinge is provided at each longeron joint, a simplification of parts is insured. Moreover, each longeron has the opposite tubular ends thereof identically slotted to those of other longerons so that they can be easily modularized for providing structures of any number of sections desired. As shown in FIG. 1, the taper hinges are rotated 180° relative to one another as one proceeds along a common serial connection of successive longerons. Where triangle-configurations of cross members are provided, the pin axes are orthogonal to a triangular cross member towards which the longeron will rotate and against which it will fold in its fully stowed position, as shown in FIG. 2. The pin axis of the latch hinges between adjacent longerons where no triangular cross members are provided are orthogonal to the folding directions of the longerons at that joint, again as shown in FIG. 2. This means, in effect, that for each serially connected set of longerons, all of the slots are parallel with one another and aligned to insure ease of assembly of the overall truss.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use in an extendable structure for movement between a collapsed state and an elogated deployed state, said structure including longitudinal support members, and cross members joined thereto,
    a tension member to be diagonally coupled to said structure at a plurality of positions for imparting tension between interconnected positions on said structure and thereby maintaining said extendable structure in its elongated deployed state, each tension member comprising a tension band having, in its relaxed state, first and second substantially straight end portions at the ends of which said tension member is coupled to said structure and a plurality of interior loop portions disposed between and joining together said first and second substantially straight end portions.

2. An extendable structure for movement between a collapsed state and an elongated deployed state comprising:
    a plurality of sections connected in tandem, each section comprising a plurality of longitudinal support members and cross members coupled therebetween, said longitudinal support members being hinged to each other and to said cross members so as to be collapsible at said hinges and stackable on top of one another in alignment with each other and said cross members in the collapsed state of said structure; and
    means for imparting tension among the members of said sections and thereby maintaining said extendable structure in its elongated deployed state comprising a plurality of tension bands diagonally coupled to the members of said sections, each tension band comprising, in its relaxed state, first and second substantially straight end portions, at the ends of which the tension band is coupled to hinge joints of said structure, and a plurality of interior loop portions disposed between and joining together said first and second substantially straight end portions, whereby, in the collapsed state of said structure the straight end portions of said tension band are aligned with a cross member and the loop portions thereof are nested out of the way of other tension bands within the collapsed configuration of said structure.

3. An extendable structure according to claim 2, wherein each of said sections comprises
    first, second and third spaced apart longitudinal support members which extend substantially along the length of said extendable structure when said structure is in its elongated deployed state; and first and second triangular-shaped cross member brace arrangements, respectively joining said first, second and third longitudinal support members together at opposite ends thereof; and wherein each longitudinal support member is comprised of first and second longeron subsections pivotally hinged at a joint therebetween and at a connection to a respective cross member brace arrangement and a longeron subsection of an adjacent section, whereby said longeron subsections are foldable at hinged joints therebetween and hinge connections at said cross member brace arrangements.

4. An extendable structure according to claim 3, wherein a respective tension band is coupled at the opposite ends thereof to the hinge joint between a triangular-shaped cross member brace arrangement at one end of one of the longitudinal support members of a respective section and to the hinge joint between a triangular-shaped cross member brace arrangement at the other end of another of the longitudinal support members of said respective section.

5. An extendable structure according to claim 3, wherein each of said hinges comprises:

a hook plate adapted to be coupled to one end of a first longeron subsection, said hook plate having a hook portion, and a pivot connection for engagement with another part of said hinge; and a first slot plate adapted to be coupled to one end of a second longeron subsection, said first slot plate having a slot in which rides a portion of a locking pin for engaging the hook portion of said hook plate, and a pivot connection for engagement with the pivot connection of said hook plate; and wherein said hook portion of said hook plate has a first surface portion to be engaged by said locking pin, and said slot in said first slot plate in which said locking pin rides has a second surface portion to be engaged by said locking pin, said first and second surface positions being shaped to effectively form a wedge between which said locking pin is held when said locking pin is engaged by said first surface portion of said hook plate and said second surface portion of said first slot plate and is urged into said hook portion of said hook plate.

6. An extendable structure according to claim 5, wherein each of said hinges further comprises:

a second slot plate adapted to be coupled to said one end of said second longeron subsection in parallel, spaced-apart relationship with said first slot plate, said second slot plate having a slot in which rides a portion of said locking pin, and a pivot connection for engagement with said pivot connection of said hook plate.

7. An extendable structure according to claim 6, wherein each of said hinges further comprises means for imparting a prescribed bias to said locking pin to urge said locking pin towards one end of the slots provided in said first and second slot plates.

8. An extendable structure according to claim 7, wherein the hook portion of said hook plate has a cam surface adapted to be contacted by said locking pin as said hook plate and first and second slot plates are rotated about said pivot connection so that said locking pin is caused to travel along said cam surface in opposition to said prescribed bias.

9. An extendable structure according to claim 8, wherein the cam surface of said hook portion terminates at an open locking pin-receiving region of said hook plate such that upon a prescribed amount of rotation of said hook plate about said pivot connection relative to said first and second slot plates, said locking pin is caused to enter said open locking pin-receiving region of said hook plate and be captured thereby in response to the urging of said locking pin by said prescribed bias imparting means.

10. An extendable structure according to claim 5 wherein that portion of said first surface portion of said hook portion of said hook plate and that portion of said second surface portion of said slot in said slot plate between which said locking pin is wedged and held thereby is located to be essentially aligned with the axes of said pair of members when said members have been joined together.

11. An extendable structure according to claim 7, wherein said prescribed bias imparting means comprises a pair of spaced apart substantially triangular-shaped plates having a toe portion at a vertex thereof, said toe portions engaging slots provided in said locking pin, and a spring member coupled to said triangular-shaped plates for causing a rotation of said plates about a prescribed axis, said presecribed axis being located to be essentially aligned with the longitudinal axis of said second member.

12. An extendable structure according to claim 11, wherein said each of said slot plates has an aperture for receiving a rotational axis member about which said triangular shaped plates are rotationally biased by said spring member, thereby causing said toe portions to urge said locking pin along said slot.

13. An extendable structure according to claim 9, wherein the pivot connection of said first and second slot plates and said hook plate is substantially coplanar with end faces of said longeron subsections.

14. An extendable structure according to claim 13, wherein the slots in said first and second slot plates and the locking-pin receiving region of said hook plate, in their locked position via the engagement of said locking pin, have a common axis that is substantially coplanar with the end faces of said longeron subsections.

15. For use with a pair of members to be pivotally rotated about a prescribed axis and joined together, a hinge arrangement comprising:

a hook plate adapted to be coupled to one end of a first of said pair of members, said hook plate having a hook portion, and a pivot connection for engagement with another part of said hinge;

a first slot plate adapted to be coupled to one end of a second of said pair of members, said first slot plate having a slot in which rides a portion of a locking pin for engaging the hook portion of said hook plate, and a pivot connection for engagement with the pivot connection of said hook plate; and wherein said hook portion of said hook plate has a first surface portion to be engaged by said locking pin, and said slot in said first slot plate in which said locking pin rides has a second surface portion to be engaged by said locking pin, said first and second surface portions being shaped to effectively form a wedge between which said locking pin is held when said locking pin is engaged by said first surface portion of said hook plate and said second surface portion of said first slot plate and is urged into said hook portion of said hook plate.

16. A hinge arrangement according to claim 15, wherein each of said hinges further comprises
a second slot plate adapted to be coupled to said one end of said second member in parallel, spaced-apart relationship with said first slot plate, said second slot plate having a slot in which rides a portion of said locking pin, and a pivot connection for engagement with said pivot connection of said hook plate.

17. A hinge arrangement according to claim 16, wherein each of said hinges further comprises
means for imparting a prescribed bias to said locking pin to urge said locking pin towards one end of the slots provided in said first and second slot plates.

18. A hinge arrangement according to claim 14, wherein the hook portion of said hook plate has a cam surface adapted to be contacted by said locking pin as said hook plate and first and second slot plates are rotated about said pivot connection so that said locking pin is caused to travel along said cam surface in opposition to said prescribed bias.

19. A hinge arrangement according to claim 18, wherein the cam surface of said hook portion terminates at an open locking pin-receiving region of said hook plate such that upon a prescribed amount of rotation of said hook plate about said pivot connection relative to said first and second slot plates, said locking pin is caused to enter said open locking pin-receiving region of said hook plate and be captured thereby in response to the urging of said locking pin by said prescribed bias imparting means.

20. A hinge arrangement according to claim 17, wherein said prescribed bias imparting means comprises a pair of spaced apart substantially triangular-shaped plates having a toe portion at a vertex thereof, said toe portions engaging slots provided in said locking pin, and a spring member coupled to said triangular-shaped plates for causing a rotation of said plates about a prescribed axis, said prescribed axis being located to be essentially aligned with the longitudinal axis of said second member.

21. A hinge arrangement according to claim 20, wherein said each of said slot plates has an aperture for receiving a rotational axis member about which said triangular shaped plates are rotationally biased by said spring member, thereby causing said toe portions to urge said locking pin along said slot.

22. A hinge arrangement according to claim 19, wherein the pivot connection of said first and second slot plates and said hook plate is substantially coplanar with end faces of said first and second members.

23. A hinge arrangement according to claim 22, wherein the slots in said first and second slot plates and the locking-pin receiving region of said hook plate, in their locked position via the engagement of said locking pin, have a common axis that is substantially coplanar with the end faces of said first and second members.

24. A hinge arrangement according to claim 15, wherein that portion of said first surface portion of said hook portion of said hook plate and that portion of said second surface portion of said slot in said slot plate between which said locking pin is wedged and held thereby is located to be essentially aligned with the axes of said pair of members when said members have been joined together.

* * * * *